United States Patent [19]
Goytisolo et al.

[11] 3,906,076
[45] Sept. 16, 1975

[54] PROCESS FOR PRODUCING ZEOLITE X MOLECULAR SIEVE BODIES

[75] Inventors: Jorge Alberto Goytisolo, Lutherville; Donald Dongsuk Chi; Hanju Lee, both of Columbia, all of Md.

[73] Assignee: W. R. Grace & Co., New York, N.Y.

[22] Filed: Oct. 3, 1973

[21] Appl. No.: 403,029

[52] U.S. Cl. .............................. 423/118; 252/455 Z
[51] Int. Cl.² ......................................... C01B 33/28
[58] Field of Search ........... 423/118, 327, 328, 329; 252/455 Z

[56] References Cited
UNITED STATES PATENTS

| | | | |
|---|---|---|---|
| 3,119,660 | 1/1964 | Howell et al. | 423/118 |
| 3,338,672 | 8/1967 | Haden, Jr. et al. | 252/455 Z |
| 3,515,681 | 6/1970 | Flank et al. | 252/455 Z |
| 3,773,690 | 11/1973 | Heinze et al. | 252/455 Z |
| 3,777,006 | 12/1973 | Rundell et al. | 252/455 Z X |
| 3,795,631 | 3/1974 | Heinze et al. | 252/455 Z |

*Primary Examiner*—Edward J. Meros
*Assistant Examiner*—Gary P. Straub
*Attorney, Agent, or Firm*—Michael J. McGreal; Kenneth E. Prince

[57] ABSTRACT

It has been found that hard attrition-resistant zeolite X molecular sieve bodies can be produced by admixing zeolite X powder and meta-kaolin clay followed by the hydrothermal conversion of the meta-kaolin clay to zeolite X. When a reaction mixture contains from about 70 percent to 90 percent by weight of zeolite X powder and from about 10 percent to 30 percent by weight of meta-kaolin clay, this admixture will hydrothermally convert to essentially all zeolite X material. This conversion is accomplished without the addition of any silica source other than the silica provided by the meta-kaolin clay.

10 Claims, No Drawings

PROCESS FOR PRODUCING ZEOLITE X MOLECULAR SIEVE BODIES

This invention relates to a process for producing synthetic crystalline zeolite X molecular sieve bodies. More particularly, this invention relates to a process for producing zeolite X bodies from a reaction mixture consisting of metakaolin clay and zeolite X powder. No further silica source is added to the meta-kaolin clay portion of the mixture during its hydrothermal conversion to zeolite X.

Surprisingly it has been found that zeolite X bodies of high strength and attrition resistance can be synthesized from an admixture consisting of essentially meta-kaolin clay and zeolite X powder. The meta-kaolin clay and the zeolite X powder is formed into shapes by the addition of a caustic solution which converts the powders into a paste-like condition. The added caustic also supplies at least part of the $Na_2O$ required to form the zeolite X product material. No further silica source is added and the shaped bodies are readily converted to essentially 95 percent or greater zeolite X. The meta-kaolin clay material which is not converted to zeolite X in the formed shapes serves as the major binding ingredient to keep the zeolite X component and the converted meta-kaolin clay component in a formed shaped condition. U.S. Pat. No. 3,119,659 discloses a process which is somewhat related to that of this invention. However, in the process of this patent it is set out that if it is desired to convert meta-kaolin clay to a zeolite X there will have to be added an additional silica source. This is the case even when a meta-kaolin clay and zeolite powder mixture are to be formed into shapes and thereafter converted to zeolite X. This patent typifies the prior art in regard to forming zeolite X from meta-kaolin clay. It has now, however, been surprisingly found that a meta-kaolin clay as defined and used in U.S. 3,119,659 can be converted directly to zeolite X when the meta-kaolin clay has dispersed therein a high content of zeolite X powder. It can only be surmised that the zeolite X powder has some catalytic or seeding effect on the meta-kaolin clay, thereby facilitating its conversion to zeolite X. This discovery was very much unexpected by the present applicants since it was their expectation that the meta-kaolin clay component of the meta-kaolin clay-zeolite X mixture would be converted to a zeolite A material. It was expected that the resulting product would be a mixture of zeolite X-zeolite A-unconverted meta-kaolin clay.

A reason for this unexpected result is that zeolite X has a silica to alumina mole ratio of about 2.5 to 3. The sodium content is on an even ratio with the alumina content for both zeolite X and zeolite A. That is, the hydrothermal conversion of meta-kaolin clay to either zeolite A or zeolite X will require the same amount of caustic. The silica to alumina mole ratio of meta-kaolin clay is essentially the same as that of zeolite A, i.e., about 1.8.

It is a general practice in the art of zeolite technology to form zeolites into various shapes using various clays and binder materials. The clay binder is usually added to a zeolite powder mixture in a ratio of about 5 to 20 percent clay binder to about 80 to 95 percent by weight of zeolite powder. These components are then thoroughly admixed, formed into a paste-like mixture, shaped, and hardened by long term calcination at high temperature. One problem in forming high strength attrition resistant zeolite shapes by this process is that it is difficult to thoroughly disperse the clay binder material throughout the zeolite powder. If the clay binder is not thoroughly and well dispersed throughout the zeolite powder, the shapes that are formed will have various weak points which will cause a loss of strength and cause a high attrition factor. The advantage of forming zeolite shaped materials by a process of adding 10 to 30 percent of meta-kaolin clay, which is also an effective zeolite binder, and 70 to 90 percent of zeolite X is that this higher content of clay can be much more easily and readily dispersed throughout the zeolite X powder component. This will result in a product of more consistent strength and attrition resistant properties. After the admixture of the meta-kaolin clay and zeolite X powders, a sodium hydroxide solution is added in order to supply some of the $Na_2O$ content required by a zeolite X material, and this mixture then shaped into spheres or other forms. Most of the meta-kaolin clay in the formed shape is then hydrothermally converted to zeolite X with or without additional supply of $Na_2O$. Generally the hydrothermal conversion reaction is continued until the formed shape consists of 95 percent or greater zeolite X and 5 percent or less of unconverted meta-kaolin clay. This unconverted meta-kaolin clay is in a very well dispersed condition whereby its ability to act as a binder for the zeolite X component is maximized.

In more detail this invention consists of forming a dry or a wet blend of zeolite X powder and meta-kaolin clay powder material followed by the hydrothermal conversion of essentially all of the meta-kaolin component to zeolite X. A wet blend means a mixture of sodium zeolite X powder and meta-kaolin blended in a slurry condition. The zeolite X powder material is in the average particle size range by weight of from about 0.1 micron up to about 50 microns, and preferably in the particle size range of 0.5 to 10 microns. The meta-kaolin clay particles are essentially in about the same average particle size range. The ratio of zeolite X powder to meta-kaolin clay in this admixture is about 70 to 90 percent by weight of zeolite X powder to about 30 to 10 percent by weight of meta-kaolin clay. These ratios are dry weight bases. A sodium hydroxide solution is then added to this admixture. The function of this solution is to provide at least part of the $Na_2O$ component necessary in the conversion of the meta-kaolin clay to zeolite X and also to provide the moisture necessary in order to form the powder admixture into pastelike shapes. The sodium hydroxide added at this point in the process provides in the range of from about 25 percent to about 110 percent of the caustic required by the meta-kaolin clay in its hydrothermal conversion to zeolite X and helps to provide sufficient strength for the formed shapes for subsequent treatments. When less than the full required amount of caustic is added at this step, the remainder will be added during the crystallization step. It is preferred that a stoichiometric excess by used in the process. This paste-like mixture is then formed into shapes such as beads, granules or cylinders by spray drying, granulating, balling or any other art technique. Extrusion and balling are the preferred methods of shaping these materials. After being shaped the materials are then placed in a container for the hydrothermal conversion of the meta-kaolin clay to zeolite X.

The hydrothermal process for converting most of the meta-kaolin clay to zeolite X consists of an aging step and a crystallization step. In the aging step the formed shapes are allowed to stand in open or closed containers at about 10°C up to about 50°C for from about 5 to 40 hours. After the aging step the meta-kaolin clay content of the formed shapes is converted to zeolite X by maintaining these formed shapes at a temperature of about 65° to 100°C for about 4–20 hours. The required amount of $Na_2O$ as a sodium hydroxide solution was not added in the shape forming step. The remainder is added in this step. This sodium hydroxide solution has a concentration of about 1 to about 25 percent sodium hydroxide. A preferred concentration is about 15 percent. Up to about 75 percent (mole) of the sodium oxide ($Na_2O$) necessary for the conversion of the meta-kaolin clay to zeolite X may be supplied by this crystallization step sodium hydroxide solution. It is generally preferred, however, that most or all of the sodium oxide necessary for the conversion of the meta-kaolin clay to zeolite X be provided by the crystallization step sodium hydroxide solution.

After the crystallization step the formed zeolite shapes are then washed using a dilute sodium hydroxide solution and/or water to remove any excess free caustic. The wash solution may be at a temperature of about 25°C to about 75°C. After washing the formed shapes are dried at about 95°C to 150°C to a point where they appear to be in a dry condition. The period of drying ranges from about 2 to about 24 hours. The dried formed shapes are then activated by calcining in an oven at about 250°C to 450°C for from about 0.5 to about 5 hours. After activation these materials are then in a condition for use as adsorbents.

The resulting formed molecular sieve bodies were analyzed in regard to their crystalline structure adsorption capacities for isobutane, $CO_2$ and water and in regard to surface area. The x-ray analysis showed the formed shapes to be essentially 100 percent zeolite X with no zeolite A being detected. That is, the crystalline materials which are present in the formed shapes are essentially completely zeolite X. This was also confirmed through adsorption experiments described in Example 3. Since meta-kaolin clay is amorphous, the remaining meta-kaolin clay which binds the formed shapes together will not be seen in the x-ray analysis.

The following examples are set out to further illustrate the present invention.

EXAMPLE 1

This example illustrates the production of 16–40 mesh beads of zeolite X using the process of this invention.

Dry blend 3120 g of zeolite X powder (23 percent water content) and 600 g of meta-kaolin clay until there is a homogenous mixture. Add to this blend a sodium hydroxide solution consisting of 216 g of NaOH dissolved in 1281 ml of water. Blend the dry mix and sodium hydroxide solution until there is formed a paste-like homogenous mixture. Form this homogenous mixture into 16–40 mesh beads using a pony mixer or pan granulator. The beads are then placed into closed containers at room temperature (about 70°F) and aged for 24 hours.

The beads are then crystallized by placing the aged beads which contain about 29.5 percent moisture into a closed container and maintained at 210°F for 8 hours. No sodium hydroxide solution was added to the container.

The crystallized beads were then washed with hot water. The wash solution temperature was 140°F. After washing the beads were drained by vacuum filtering.

These beads were dried at 210°F for 16 hours in a forced air oven and activated by heating at 700°F for 2 hours. The beads, on x-ray analysis, have the characteristic pattern of zeolite X with no zeolite A lines.

EXAMPLE 2

This example illustrates the method of making a commercial grade of zeolite X beads bound with an attapulgite clay.

Dry blend 2490 g of zeolite X powder (23 percent water content) and 510 g of attapulgite clay until a homogenous mixture is formed. Add water to this mixture to raise the water content to 39 percent. This wet mixture is blended until it forms a paste-like consistency, followed by being formed into 4–8 wash beads using a pony mixer or pan granulator. These beads are then aged for 4 hours, dried in a forced air oven at 250°F and activated by heating to 570°F for 2 hours.

EXAMPLE 3

This example is a comparison of properties of the product of Example 1 with that of Example 2. Table 1 sets out the values for each significant adsorbent property. Of particular note is the higher capacity and desorption rate for i-butane, carbon dioxide and water. The increased adsorption capacity of i-butane indicates type X zeolite formation from m-kaolin, because type A zeolite can not adsorb i-butane due to its large adsorbent molecular dimension, but type X zeolite can. This means that the zeolite X of Example 1 can adsorb more i-butane, carbon dioxide or water per pound than the conventional clay bound zeolite X of Example 2. The rate of mass transfer (desorption rate) of i-butane and carbon dioxide into and from the zeolite X of Example 1 is greater than that of Example 2. By having a higher mass transfer rate and capacity the zeolite X can be cycled at a greater rate and thereby separate more feed stream gas. The process advantage is obvious. The processor can operate at a higher rate of production using less adsorbent.

A reason for the superior mass transfer properties is theorized to be the more effectively developed macropore structure. On adsorption the macropores allow for more rapid diffusion of gaseous materials into and out of the formed shape. The macropores distribute the gaseous materials to the micropores, which selectively adsorb at least one component. On desorption the procedure is reversed. That is, the macropore structure permits a more rapid exit of selectively adsorbed components from the formed shape.

Table 1

| Properties | Example 1 | Example 2 |
| --- | --- | --- |
| i-Butane Capacity at 760 mmHg (%) and 25°C | | |
| 10 minutes | 14.55 | 10.43 |
| Equilibrium | 15.14 | 10.90 |
| i-Butane Desorption under vacuum (% Sieve Wt.) | | |
| 5 minutes | 6.13 | 4.88 |
| 10 minutes | 8.14 | 6.04 |
| 15 minutes | 9.42 | 6.84 |
| 20 minutes | 10.45 | 7.47 |

Table 1-Continued

| Properties | Example 1 | Example 2 |
|---|---|---|
| $CO_2$ Capacity at 250 mmHg (%) and 25°C | | |
| 10 minutes | 16.05 | 13.63 |
| Equilibrium | 19.77 | 15.90 |
| $CO_2$ Desorption under vacuum (% Sieve Wt.) | | |
| 5 minutes | 13.13 | 9.44 |
| 10 minutes | 15.23 | 10.89 |
| 15 minutes | 16.51 | 12.00 |
| 20 minutes | 17.36 | 12.77 |
| $H_2O$ Capacity at 10% R.H. (%) and 25°C | — | 20.19 |
| Surface Area (m²/g) | 6.05 | 5.33 |
| Packed Density (lb/cu ft) | 40.90 | 44.20 |

EXAMPLE 4

This example illustrates the difference in product when zeolite X in Example 1 is replaced with zeolite A. The same process steps were conducted, but with the product now being a zeolite A. The x-ray diffraction pattern was characteristic of zeolite A. Table 2 sets out the properties of the zeolite A material tested as zeolite 5A (calcium form).

Table 2

| Properties | Example 4 |
|---|---|
| Packed Density (lb/cu ft) | 42.50 |
| S. A. (m²/g) | 535.00 |
| $H_2O$ Capacity of intermediate zeolite 4A at 10% R. H. and 25°C (%) | 21.50 |
| n-Butane Capacity at 760 mmHg and 25°C (%) | 12.24 |
| n-Butane Desorption (% Sieve Wt.) | |
| 5 minutes | 4.65 |
| 10 minutes | 5.47 |
| 15 minutes | 6.01 |
| 20 minutes | 6.45 |
| i-Butane Capacity at 760 mmHg and 25°C (%) | 0.20 |

A comparison of Examples 1 and 4 provides very convincing evidence that the included zeolite has the effect of directing the zeolite which is produced. In Example 1, when zeolite X is the included zeolite, the meta-kaolin clay converts to zeolite X without the addition of a further silica source. When, as in Example 4, the included zeolite is a zeolite A the product is a zeolite A. It can only be surmised that at zeolite to meta-kaolin ratios of 70-30 to 90-10 the crystalline zeolite has a considerable effect on the zeolite into which the meta-kaolin is converted on hydrothermal conversion. This effect of the zeolite powder on the clay when present in a high percentage is unexpected since it would be assumed that a zeolite X-meta-kaolin blend would convert to essentially a zeolite X-zeolite A blend with the remainder being binding unconverted meta-kaolin.

The preferred method of synthesis of these zeolite X forms is as set out in Example 1 wherein the full amount of caustic is added prior to shape forming. Another method which can be used, and with equally good results, is to add about half of the required sodium content as caustic prior to forming, with the remainder of the sodium content added as caustic during the crystallization step. One reason for a two addition addtiion is that the admixture of caustic solutions and meta-kaolin clay is exothermic, and therefore if conducted in a single stage excessive heating must be prevented. The two stage addition does not require such precautions in the initial addition, but has the disadvantage of an added procedure. Also when the remainder of the required sodium content (as caustic) is added in the crystallization step, this solution should be circulated as by mixing or solution pumping to insure a homogenous transfer of the caustic into the formed shapes. This is important since meta-kaolin clay within the formed shape must come into contact with this solution for subsequent reaction to form zeolite X.

The weight quantity of caustic solution to be used in the process is determined after assay of the meta-kaolin clay for the component contents. The water content is important since this can cause error in the calculations. Since the mole ratio of sodium in the final product is equimolar with alumina, the weight quantity added is arrived at by means of routine calculations:

What is claimed is:

1. A method of forming shaped zeolite X materials comprising:
   a. forming an admixture of zeolite X and meta-kaolin clay wherein said zeolite X is present in a content of about 70 percent to 90 percent by weight and said meta-kaolin clay comprising the remainder of the admixture;
   b. adding a sodium hydroxide solution containing about 25 percent to 110 percent of the $Na_2O$ required to convert said meta-kaolin component to zeolite X and thereby forming a paste-like admixture;
   c. forming said admixture into shapes;
   d. aging said shapes at about 10°C to 50°C for about 5 to 40 hours;
   e. adjusting the content of $Na_2O$ of said aged shapes to about 110 percent of that required to convert said meta-kaolin component to zeolite X by immersing said shapes in a sodium hydroxide solution and hydrothermally converting said meta-kaolin clay to zeolite X by maintaining said shapes at about 65°C to 110°C for about 4 to 20 hours;
   f. washing said zeolite X shapes to remove any excess free sodium hydroxide; and
   g. drying and activating said zeolite X shapes.

2. A method as in claim 1 wherein the zeolite X and meta-kaolin clay in said admixture have an average particle size of about 0.1 to 50 microns.

3. A method as in claim 2 wherein said sodium hydroxide solution in step (b) supplies about 50 percent to 100 percent of the $Na_2O$ required to convert said meta-kaolin clay component to zeolite X.

4. The method as in claim 2 wherein said admixture is formed into granules.

5. The method as in claim 2 wherein said admixture is formed into spheres.

6. The method as in claim 2 wherein said admixture is extruded into cylindrical shapes.

7. The method as in claim 2 wherein said shapes are aged at room temperature for about 15 to 30 hours.

8. The method as in claim 2 wherein said aged shapes are contacted with said sodium hydroxide solution in step (e) at about 90°C to 100°C for about 8 to 12 hours.

9. The method as in claim 2 wherein said admixture contains about 20 percent by weight meta-kaolin clay and about 80 percent by weight zeolite X.

10. The method as in claim 2 wherein said admixture contains about 15 percent by weight meta-kaolin clay and about 85 percent by weight of zeolite X.

* * * * *